Figure 1:
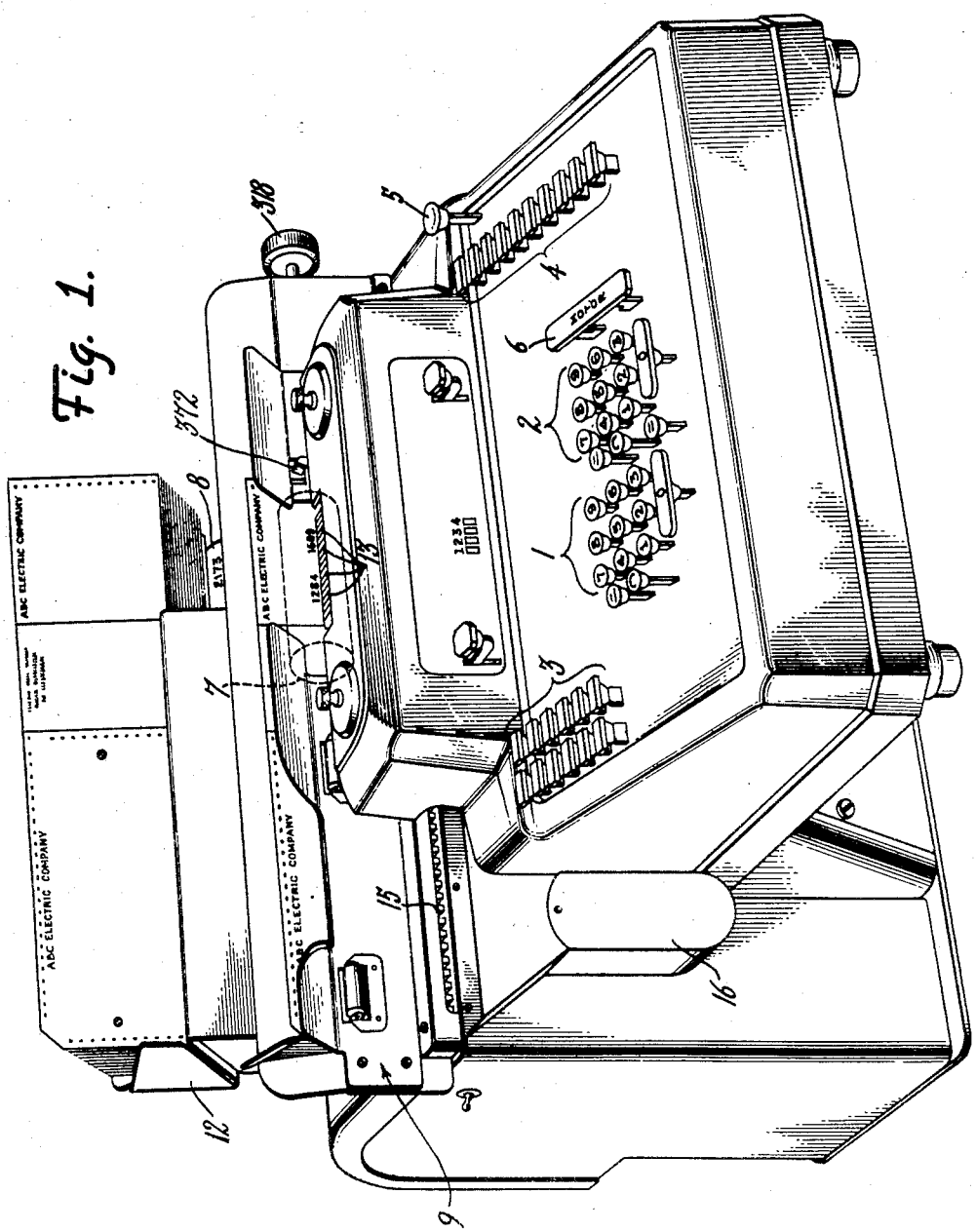

Aug. 22, 1950     O. J. SUNDSTRAND     2,520,070
ACCOUNTING MACHINE

Original Filed June 24, 1941     5 Sheets-Sheet 2

INVENTOR
OSCAR J. SUNDSTRAND
BY
ATTORNEY

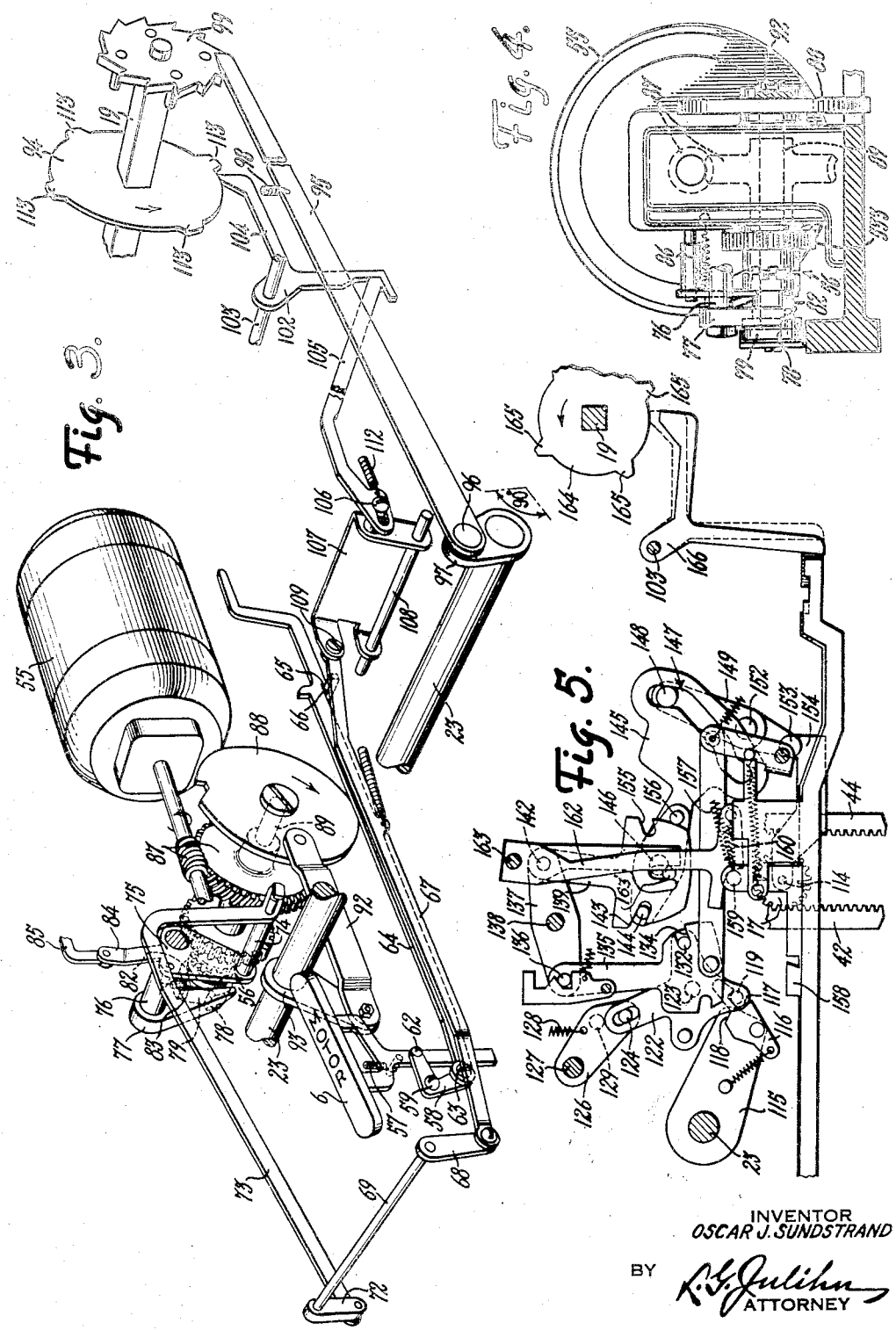

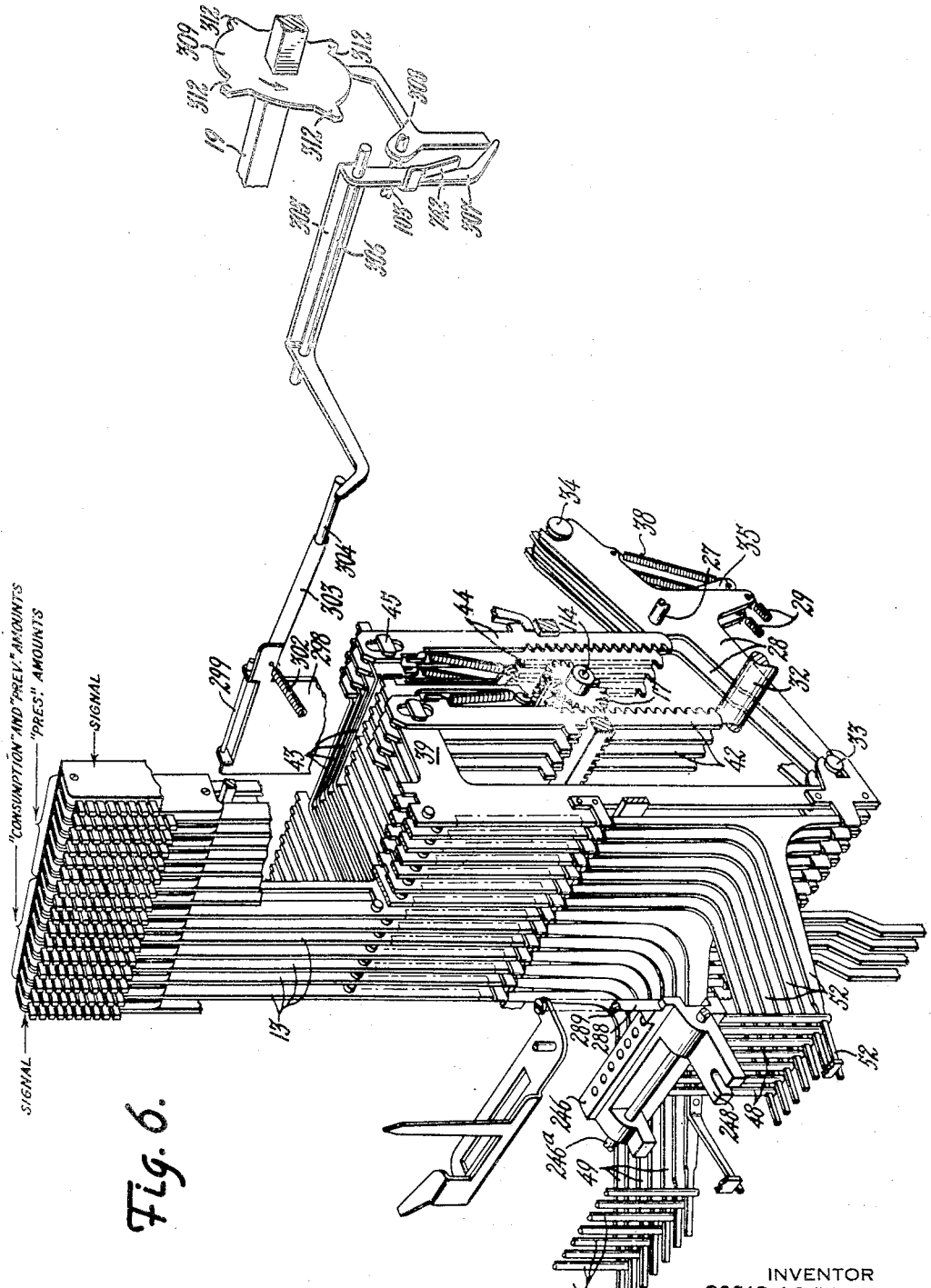

Aug. 22, 1950
O. J. SUNDSTRAND
2,520,070
ACCOUNTING MACHINE
Original Filed June 24, 1941
5 Sheets-Sheet 5
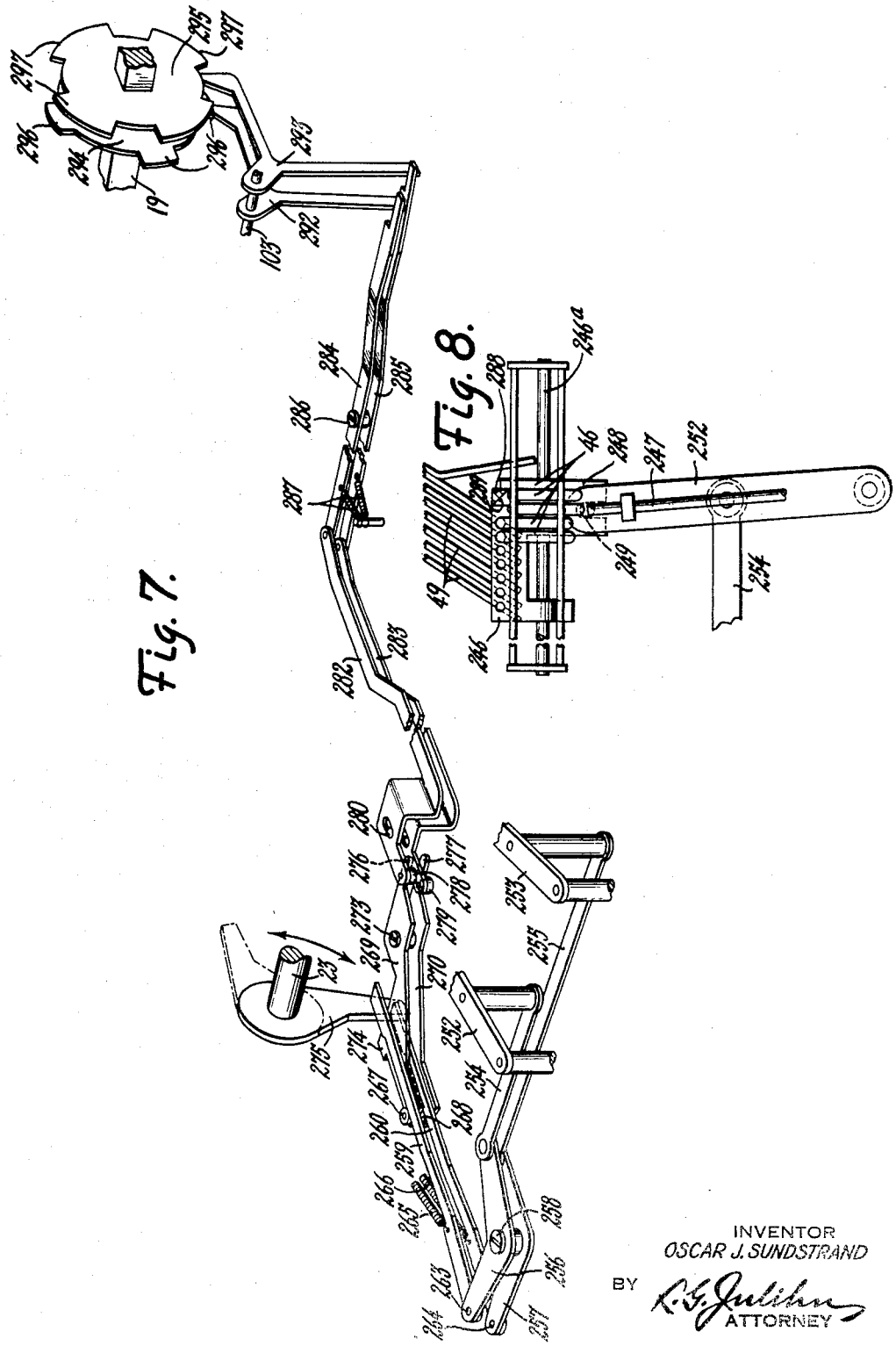
INVENTOR
OSCAR J. SUNDSTRAND
BY
ATTORNEY Patented Aug. 22, 1950

2,520,070

UNITED STATES PATENT OFFICE 2,520,070

ACCOUNTING MACHINE

Oscar J. Sundstrand, West Hartford, Conn., assignor to Underwood Corporation, New York, N. Y., a corporation of Delaware Original application June 24, 1941, Serial No. 399,461. Divided and this application August 20, 1945, Serial No. 611,538

6 Claims. (Cl. 235—60.27)

This invention relates to accounting machines and more particularly to a machine for printing, proving and punching public utility company bills.

Utility companies. such as for example, electric power companies, generally render their customers monthly bills showing in kilowatt-hours the previous and present meter readings and the difference between the two, this difference being the consumption of electricity by the user. Many companies find it desirable to use bills of the punched card type such as used by the well-known McBee Keysort system, in which code slots, representative of the "Consumption" amount, are punched in the card to facilitate rapid sorting and analysis for classification of the user.

In performing such billing operations, the "Previous" and "Present" amounts are taken from the meter reader's book, together with his computation of the difference, and are indexed in the accounting machine keyboard by the operator. In this method of billing there is obviously the possibility that either the meter reader or operator has made an error in reading or handling the amounts.

The primary object of the invention is to produce a machine for printing the amounts upon a bill or worksheet, for entering said amounts upon a totalizer or register mechanism, for performing certain computations from said entries to prove the correctness of one or more of said amounts and for punching the latter amount in the bill if the entries are correct.

With this object in view, the invention involves certain novel and improved features, constructions and combinations of parts hereinafter described and particularly pointed out in the claims the advantages of which will be readily understood and appreciated by those skilled in the art.

The present application constitutes a division of applicant's pending application Serial No. 399,461, filed June 24, 1941, for an improvement in accounting machines, since matured into Patent No. 2,459,468, dated January 18, 1949.

It is to be understood that the mechanisms of the machine not fully shown and described in this application have the same construction and mode of operation as the corresponding mechanisms of the machine shown and described in said application Serial No. 399,461.

The invention will be readily understood from the accompanying drawings illustrating a machine embodying the invention in its preferred form and the following detailed description of the construction therein shown.

Figure 2:
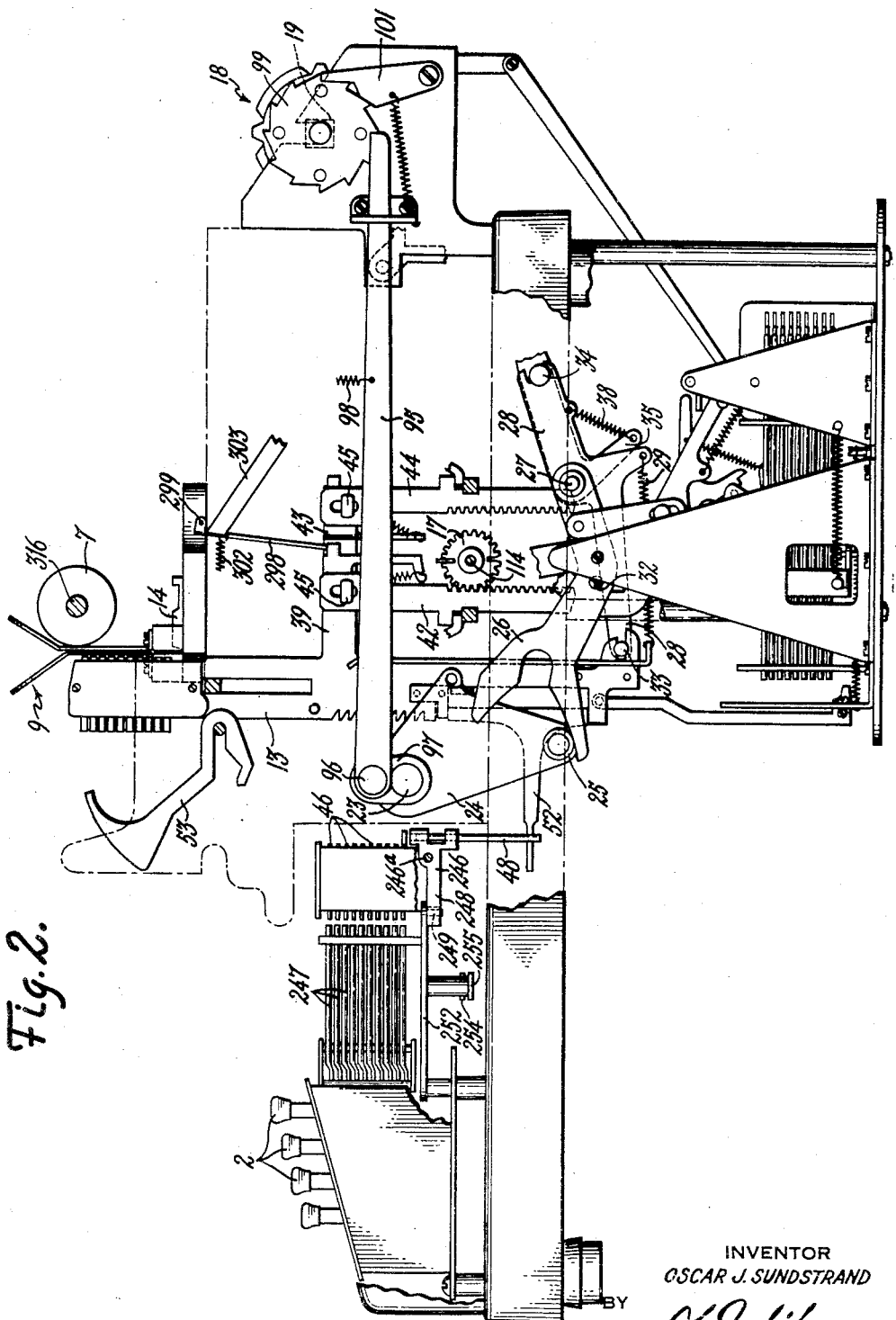

In the drawings:

Figure 1 is a perspective view of an accounting machine embodying the invention, Figure 2 is a right side elevation showing the crossfooter, registers, punch selector mechanism, type bars and actuating mechanism, Figure 3 is a perspective view of the motor and the associated machine cycling mechanism, Figure 4 is a detail front elevation of the motor clutch mechanism, Figure 5 is a right side elevation of the crossfooter engaging, actuating and automatic subtraction control mechanism, Figure 6 is a perspective view (taken from the right) of the type bars, crossfooter, and the actuating racks therefor, Figure 7 is a perspective view (taken from the right) of the mechanism for retaining amounts indexed until the appropriate cycle, and Figure 8 is a fragmental top plan view of certain parts of the left keyboard amount indexing mechanism and showing its connection with the amount clearing and retention mechanism.

General description

In many respects the present machine is similar to the one disclosed in U. S. Patent No. 2,194,270 to Oscar J. Sundstrand. The machine includes a keyboard having punch setting keys, operation controlling keys and two groups (left and right) of amount keys. The machine has a chute for supporting front fed forms or bills and a stationary carriage having a platen for supporting rear fed paper. It has three totalizers, which, in the following description will be referred to as the crossfooter and two registers, the crossfooter being capable of adding and subtracting, and the registers being capable of adding only. Each of the registers is divided into two sections, making each capable of accumulating two separate amounts.

The machine has the usual type bars and associated actuators that are adjustable under the control of stops set by the amount keys. The actuators associated with the left group of amount keys are arranged to add amounts entered in that group in the crossfooter and the left sections of the registers and the actuators associated with the right group of amount keys are arranged to subtract amounts entered in that group from the crossfooter and add said amounts in the right section of one of the registers. A series of control cams that are rotated during each machine cycle, automatically control the various machine operations that may be initiated manually by the keyboard. A key is provided for conditioning the machine for automatic control by the cams, or manual control by the keys.

A series of punches is provided, certain of which are automatically set for punching code slots in the bill corresponding to one of the amounts entered on the left group of amount keys, and others of which are manually set by the punch setting keys for punching slots designating various classifications. Sensing mechanism under the control of the crossfooter and a part of the machine cycling mechanism is provided so that all of the set punches will be actuated upon the completion of a billing operation if the proper amounts are entered.

The machine is started by depression of a motor bar. In a single billing operation, the motor bar is depressed twice, the first depression causing the machine to cycle once, and the second depression causing the machine to cycle twice. Hereinafter these cycles will be referred to as the first, second and third machine cycles.

In order that the following description may be more readily understood, a skeleton outline of the sequence of machine operations in rendering a bill for an electric power consumer will now be given. It will be understood that the choice of an electric power company as a user of the machine is illustrative only and simply gives a typical example of one of the many uses to which the machine is adapted. In such billing operations, the (kilowatt-hour) "Consumption" amount is indexed in the left amount keyboard and the motor bar depressed to initiate the first machine cycle. During this cycle the "Consumption" amount is printed on a tally strip and added in the crossfooter and in the left section of one of the registers. Also during this cycle, a bill count of "1" is automatically effected in the right (counter) side of said register, and punches representative of the "consumption" amount are automatically set, ready to punch the code slots in the bill. Following this first cycle, the bill is inserted in the chute, the manually controlled classification punches are set, the "Previous" and "Present" meter reading amounts are indexed in the left and right amount keys, respectively, and the motor bar is depressed to initiate the second cycle. During this cycle the "Previous" amount is printed on the bill and added in the crossfooter and in the left section of the other register. The "Present" meter reading amount is held indexed in the keyboard but is non-printed and non-accumulated during this second cycle. During the third cycle, the "Present" meter reading amount is printed upon the bill, is added in the right section of the latter register, and is subtracted from the crossfooter.

Following the third machine cycle, if the crossfooter is cleared, as it will be if the amounts entered are correct (i. e., if the total of the "Consumption" and "Previous" amounts equals the subtracted "Present" amount) the punches will be automatically actuated to punch slots representative of the "Consumption" amount and the classification in the bill. Following this punching, the bill is automatically ejected.

At the end of a day's billing, the machine may be conditioned for manual control by depressing the manual control key. Thereupon, totals of the "Consumption" amounts and the bill count may be taken from one of the registers. Likewise, totals of the "Previous" and "Present" meter readings may be taken from the other register.

*Certain of the machine sections and actuating mechanism*

Referring to Figure 1, the machine includes the customary keyboard having two sets (left and right) of amount keys 1 and 2, punch setting keys 3, operation controlling keys 4, a manual control key 5 and a motor bar 6. The machine has a roller platen 7 around which a tally 8 is fed, a chute 9 being provided in front of the tally for receiving bills or work sheets from a supply magazine 12 for printing by type bars 13.

A series of punches such as 14 (Figure 2) located to the rear of an aperture 15 (Figure 1) are arranged to punch slots in the lower edge of the bill. A removable container 16 is provided to receive the punchings.

Situated in front of the registers is a crossfooter 17 having a plurality of twenty-tooth wheels capable of both addition and subtraction.

The machine is arranged to be normally under the automatic control of cams indicated generally at 18 mounted upon a cam shaft 19 that is normally rotated during the second half of each machine cycle. Automatic control by cams 18 may be disabled and manual control by keys 4 enabled by depression of the manual control key 5.

The machine is operated by an actuating shaft 23 that is arranged to be rocked first counterclockwise and then clockwise during each cycle of the machine under the control of the machine cyling mechanism, to be later described.

Two similar arms 24, only one of which is shown, are secured to drive shaft 23 and are each provided with rollers such as 25, that rest in cam slots in the forward ends of two similar arms such as 26, pivoted on a rod 27 and situated on opposite sides of type bars 13. A series of actuating levers such as 28, there being a lever for each type bar, are pivoted on rod 27 between arms 26 and are tensioned clockwise about the rod by springs such as 29 so that the upper edges of the levers rest against a tie rod 32 secured between arms 26. The forward ends of levers 28 are each pivoted at 33 to their corresponding type bars 13 which are guided for vertical movement in the machine frame. The rear end of each lever 28 is connected by pin and slot connection 34 to a bell crank 35 also pivoted on rod 27 adjacent each actuating lever. These levers respectively are connected with register actuating racks (not shown). Springs such as 38 connected between each bell crank and lever 28, normally tension the bell cranks counterclockwise about rod 27 so that the pins of the pin and slot connections 34 are urged toward the upper edges of the slots.

Type bars 13 are divided into two groups indicated as "Consumption and Previous" and "Present" in Figure 6. The left or "Consumption and Previous" group of type bars is associated with the left set of amount keys 1 (Figure 1) whereas the right or "Present" group is associated with the right set of amount keys 2. Rearward projections 39 (Figures 2 and 6) on the right group of type bars support a series of subtracting racks 42 on one side of the crossfooter wheels 17 and similar but longer and offset projections 43 on the left group, support a series of adding racks 44 on the opposite side of the crossfooter. The usual pin and slot connections 45 are provided between the racks and the projections for transfer purposes, the transfer mechanism being identical with that disclosed in the before-mentioned Patent 2,194,270.

Operation of the machine causes arms 24 and 26 (Figure 2) to be raised and lowered during each cycle. As rod 32 rises during the first half of the cycle, actuators 28 raise such of the type bars 13 as are free to rise under tension of springs 29 and corresponding crossfooter actuating racks 42 and 44 rise therewith. As rod 32 descends, during the second half of the cycle, the actuators are restored, restoring the type bars and racks to the normal position shown in Figure 2. The extent of vertical movement of the type bars and racks is controlled by stops 46 that are moved by amount keys 1 and 2 into the path of vertically disposed rods 47 and 48 (see Figure 6) connected to the forward ends of arms 49 and 52 that are pivoted to the left and right groups of type bars 13, respectively. Printing is effected by hammers 53 (Figure 2) that are tripped shortly after all the bars have risen to their fullest extents as determined by the amounts indexed on the keyboards, to strike impression type carried by the type bar. It will be noted that, by the offset projections 43 and location of adding racks 44, amounts indexed in the left set of amount keys 1 will be added on the crossfooter whereas amounts entered in the right set of amount keys 2 will be subtracted on the crossfooter.

The machine cycling mechanism

For reasons which will hereafter appear, a single billing operation requires three machine cycles, the first and second of which are initiated manually and the third of which is initiated automatically. This sequence of cycles is continuous during all normal or billing operations, and the following mechanism is provided to effect its accomplishment.

Referring to Figure 3, the machine is driven by an electric motor 55. The motor is started by the closing of a suitalbe switch mechanism (not shown) upon depression of motor bar 6. Depression of the motor bar also releases a clutch mechanism 56 (see also Figure 4) to engage the motor with actuating shaft 23.

The motor bar 6 is mounted in the machine frame for vertical movement and is held in its upper position by a spring 57. A bell crank 58 pivoted at 59 to the machine frame has one of its arms pivoted at 62 to the stem of the motor bar and its opposite arm pivoted at 63 to one end of a link 64 extending toward the rear of the machine. A shoulder 65 on link 64 lies behind a block 66 on another link 67 connected at its forward end to an arm 68 secured to a shaft 69 extending across the front of the machine. An arm 72, also secured to shaft 69, is pivoted to a link 73 connected at its rear end by pin and slot connection to a stud 74 secured to a plate 75 fixed to a shaft 76. An arm 77 secured to shaft 76 normally lies above a shoulder 78 on a cam 79 on a release sleeve 82. A spring 83 secured to plate 75 normally holds these parts in the positions shown. An arm 84 extends upwardly from plate 75 and is connected to a link 85 extending toward the rear of the machine. Depression of the motor bar rocks lever 58 and pulls link 64 forward. Shoulder 65 pulls link 67 forward, rocking shaft 69 and pulling link 73 and plate 75 forward against the tension of spring 83. This rotates shaft 76, removing arm 77 from shoulder 78 and moves link 85 to the rear. The removal of arm 77 from shoulder 78 permits clutch 56 to engage under the tension of a spring 86 (Figure 4), and the movement of link 85 starts the electric motor in the manner disclosed in Patent No. 2,194,270. The starting of the motor, together with the engaging of the clutch, through a worm and worm gear drive 87, imparts rotation to a disk 88 secured on one end of a shaft 89, the opposite end of the shaft being keyed for rotation with the driven element of clutch 56. A link 92 connected between disk 88 and a crank arm 93 secured on shaft 23 rocks shaft 23 first counterclockwise, and then clockwise about 90° during each cycle of the machine as previously described. Toward the end of the machine cycle shoulder 78 is again engaged by arm 77 under tension of spring 83 which restores the parts to normal position upon release of motor bar 6, thus disengaging the driven element of clutch 56 from the driving element thereof and ending the cycle. The first and second machine cycles previously referred to are initiated by repressing motor bar 6 as above described.

The third cycle is automatically initiated under the control of a motor repeat cam 94 secured on cam shaft 19. A pawl 95 is pivoted at 96 to an arm 97 secured on actuating shaft 23. The opposite end of pawl 95 is held under tension of a spring 98 in engagement with teeth of a twelve-toothed ratchet wheel 99 secured to shaft 19. During each oscillation of shaft 23, pawl 95 engages a tooth of the ratchet wheel and rotates shaft 19 and cam 94 one-twelfth of a revolution. A stop pawl 101 (Fig. 2) holds ratchet 99 against improper rotation. A bell crank 102 pivoted on a rod 103 in the machine frame has a horizontal arm 104 lying beneath cam 94, and a vertical arm engaging a link 105. The forward end of link 105 is pivoted by a pin and slot connection 106 to one side of a bail 107 pivoted on a rod 108 stationary in the machine frame. The opposite side of bail 107 is pivoted at 109 to the rear end of link 67. A spring 112 connected to link 105 tensions the link rearwardly and arm 104 upwardly against cam 94. At the end of the third machine cycle, the parts rest in positions shown in Figure 3.

Upon rotation of shaft 19 during the second half of a second machine cycle, one of four cam surfaces 113 on cam 94 cams arm 104 downwardly, rocking bell crank 102 clockwise and thrusting link 105 forwardly. Forward movement of link 105 rocks bail 107 and thrusts link 67 forward to initiate the third machine cycle automatically. During the second half of this third cycle, pawl 95 rotates shaft 19 removing cam surface 113 from over arm 104, whereupon the parts restore to the positions shown in Figure 3 under tension of spring 112, and so on.

The number of additional cycles initiated by cam 94 is not limited to one but may be varied to suit the requirements of the particular accounting form to be filled out. When two or more automatic repeat cycles following the depression of the motor bar are required, additional cam surfaces 113 may be placed on cam 94 to initiate such cycles. For example, if a total or subtotal is to be printed automatically following the entry of a key set item in a motor bar initiated cycle, two additional cycles are required and two adjacent cam surfaces 113 would be placed on cam 94.

Crossfooter engagement and actuation

Crossfooter 17 is engageable with either adding racks 44 or subtracting racks 42, the mode of operation of the present invention requiring its engagement with the adding racks during the latter portion of the first and second machine cycles and with the subtracting racks during the latter portion of the third cycle. The wheels of the crossfooter are rotatably mounted on a shaft 114. Shaft 114 is shiftable bodily from its left position where the wheels mesh with subtracting racks 42, toward the right, to an intermediate position where the wheels are disengaged from both sets of racks and thence further to the right where the wheels engage the adding racks 44.

Referring now to Figure 5, the cross-footer engaging mechanism includes an actuating arm 115 secured to actuating shaft 23. A spring tensioned pawl 116 pivoted on arm 115 has two shoulders 117 and 118, the shoulder 117 engaging a pin 119 fixed on a plate 122 pivoted at 123 to the machine frame. Plate 122 is connected by a pin and slot connection 124 to a lever 126 pivoted on a rod 127. A spring 128 normally tensions lever 126 counterclockwise about rod 127. Lever 126 carries a pin 129 engageable by shoulder 118 of pawl 116. A stud 132 fixed on plate 122 is embraced by a notch 134 in the rear edge of a pendent 135. The upper end of pendent 135 is pivoted at 136 to a rocker 137 pivoted on a stationary rod 138. Another pendent 139 pivoted at 142 on the opposite end of rocker 137 has a notch 143 embracing a stud 144 fixed in a cam lever 145 pivoted at 146 in the machine frame. Lever 145 has a cam slot 147 embracing a roller 148 secured on a lever 149 pivoted at 152 in the machine frame. The lower end of lever 149 is pivoted at 153 to one of a pair of identical arms 154 between which crossfooter shaft 114 is supported. At the end of the third machine cycle (i. e., the end of a billing operation) the parts are in the positions shown in Figure 5 with crossfooter 17 engaging subtraction racks 42 and roller 148 lying in the upper end of slot 147. Upon depression of the motor bar to initiate the first cycle of a billing operation, as arm 115 swings counterclockwise, shoulder 117 rotates plate 122 counterclockwise raising pendent 135 and lowering pendent 139. This movement of the parts causes lever 145 to oscillate sufficiently to move the crossfooter to a position equidistant from both sets of racks 42 and 44, roller 148 now lying in the intermediate portion of slot 147. At this time, a notch 155 in the right edge of pendent 139 lies opposite a pin 156 in lever 145 and pendent 139 is swung toward the right so that notch 143 disengages from pin 144 and notch 155 engages pin 156 under the tension of a spring 157 connected to a subtract slide 158. Slide 158 carries a pin 159 bearing against one arm of a yoke 162 connected to the slide by a spring 160. Yoke 162 is pivoted at 163 in the machine frame, and has another arm connected by pin and slot connection 163' with pendent 139 to transmit movement of slide 158 to pendent 139. At the beginning of the second half of this cycle, as arm 115 swings clockwise, shoulder 118 engages pin 129 and rotates plate 122 in a clockwise direction lowering pendent 135 and raising pendent 139. Since notch 155 now engages pin 156, lever 145 oscillates further counterclockwise and the lower portion of slot 147 cams lever 149 sufficiently in a counterclockwise direction to bring crossfooter 17 into mesh with adding racks 44. During the next or second machine cycle, notch 155 remains in engagement with pin 156 consequently, as pendent 139 is lowered and raised at the beginning of the first and second half of this cycle, respectively, crossfooter 17 will be disengaged from racks 44 at the beginning of the cycle and reengaged therewith at the beginning of the second half of the cycle.

A subtract cam 164 secured on shaft 19 has four cam surfaces 165. During the second half of this second cycle cam 165 will have been rotated sufficiently to cause one of the surfaces to cam a bell crank 166 pivoted on rod 103, clockwise. A vertical arm of bell crank 166 lies behind the rear end of subtract slide 158 and clockwise movement of the bell crank thrusts the slide forward withdrawing pin 159 from the shoulder on yoke 162. This movement stretches spring 160 and tensions yoke 162 clockwise about pivot 163 and, through the pin and slot connection 163', tensions the left edge of pendent 139 against pin 144, notch 155, however, still remaining in engagement with pin 156. Upon initiation of the third cycle by motor repeat cam 94 as described in the preceding section, as pendent 139 is lowered, crossfooter 17 is withdrawn from engagement with adding racks 44 to neutral position and when pin 144 comes in alignment with notch 143 pendent 139 shifts clockwise under tension of spring 160 so that notch 155 disengages from pin 156 and notch 143 engages pin 144. At the beginning of the second half of this cycle as pendent 139 is raised, lever 145 is oscillated sufficiently in a clockwise direction to engage crossfooter 17 with subtraction racks 42 as shown in Figure 5. During this second half of this cycle rotation of cam shaft 19 by pawl 95 removes the effective cam surface 164 from over bell crank 166 whereupon spring 157 through yoke 162 tensions the right edge of pendent 139 against pin 156, notch 143, however, remaining in engagement with pin 144 until the beginning of the first cycle of the next billing operation, as described in the beginning of this section. At the beginning of this next first cycle, when notch 155 engages pin 156, slide 158 moves to the right under tension of spring 157 swinging bell crank 166 into effective relation with cam 164 ready for actuation by the next cam surface 165.

From the foregoing it is noted that at the beginning of a machine cycle when type bars 13 and racks 42 and 44 rise, differentially in accordance with the amounts indexed on the amount keys 1 and 2, crossfooter 17 is disengaged from the racks, and that at the beginning of the second half of the cycle the crossfooter is engaged with the racks. As the racks restore, the crossfooter wheels are rotated clockwise or counterclockwise to add or subtract the amount printed on or from the crossfooter.

With the exception of the operation of subtract slide 158 through the medium of cam 165 and bell crank 166, the crossfooter engaging and actuating mechanism above described is identical with that disclosed in the before-mentioned Patent 2,194,270.

Mechanism for retaining indexed amounts in the indexing mechanism

Ordinarily on machines of this character, an amount entered on the amount keys is cleared from their associated indexing mechanism at the end of the cycle immediately succeeding its entry. The three cycle mode of operation of the present invention, however, requires certain amounts entered on amount keys 1 and 2 to be retained in the indexing mechanisms until the appropriate machine cycle for their printing and accumulation.

To expedite billing operations, it is desirable to enter the "Consumption" amount of the next bill upon the left set of amount keys 1 during the third cycle of a preceding billing operation and it is necessary, therefore, to retain said amount indexed, ready for printing and accumulation on the first machine cycle of the next billing operation. Likewise, because the "Previous" and "Present" amounts are entered concurrently on keys 1 and 2 respectively, before initiating the second machine cycle and the "Previous" amount only is printed and accumulated during this cycle, it is necessary also to retain the "Present" amount indexed throughout the second cycle and until the end of the third (automatically initiated) cycle for printing and accumulation during the latter. The mechanism for retaining these amounts indexed in this manner will now be described.

Each set of amount keys 1 and 2 has identical indexing mechanism. Each indexing mechanism includes settable stops 46 (Figures 2 and 8) which, as before stated, are moved into the path of pins 47 and 48 (see also Figure 6) by depression of their corresponding amount keys 1 and 2. Pins 47 and 48 lie just behind the stops and are normally positioned to the left thereof as viewed in Figure 8, each group of pins being guided for vertical movement in openings in separate, transversely movable slides 246 mounted on a rod 246a. Depression of keys 1 and 2 thrusts rods such as 247 rearwardly setting the stops. Each slide 246 is provided with a forwardly extending projection such as 248, having a pin and slot connection 249 with separate corresponding swinging brackets 252 and 253 in which rods 247 are slidably mounted.

Through an escapement mechanism (not shown) associated with each slide 246, brackets 252 and 253, and each set of keys 1 and 2, indexing of a number by these keys as above described allows the corresponding slide, bracket and rods to move step by step toward the right (Figure 8), one step for each digit indexed, and thereby move pins 47 or 48 (Figure 6) under the rear ends of the stops 46 set by the amount keys. In Figure 8, which shows the indexing mechanism that is associated with the left set of amount keys 1, pins 47 are shown moved two steps to the right, and two corresponding stops 46 have been set. Hence, as the machine is cycled, and type bars 13 (Figures 2 and 6) rise, pins 47 strike against the differentially set stops 46, in which position corresponding type characters in the upper ends of the type bars are brought into printing alignment with platen 7. Shortly after this, impression hammers 53 are operated to print the amount, and then type bars 13 are lowered to normal position during the last half of the machine cycle.

The following parts are provided to automatically restore slides 246 and pins 47 and 48 to their left or normal position and to restore stops 46, toward the end of a machine cycle, for the next amount indexing operation. Links 254 and 255 (Figure 7) are each pivoted at one of their ends to brackets 252 and 253 and at their opposite ends to arms of a pair of bell cranks 256 and 257. Bell cranks 256 and 257 are pivoted on a stud 258 secured in the machine frame. Each of a pair of slides 259 and 260 is pivoted at 263 and 264 to the opposite arms of bell cranks 256 and 257 and extend toward the rear of the machine, the rear ends of the slides being suitably guided for lateral and longitudinal movement.

Springs 265 and 266 connected to slides 259 and 260 and the machine frame, normally tension the slides counter-clockwise about their pivots causing the left edges of the slides to bear against rollers 267 and 268 on one arm of each of a pair of bell cranks 269 and 270. Bell cranks 269 and 270 are pivoted on a stud 273 secured to the machine frame and each has a shoulder such as 274 lying in the path of movement of a restoring arm 275 secured on the left end of rock shaft 23. The opposite arms of bell cranks 269 and 270 have fingers 276 and 277 that lie behind studs 278 and 279 each of which are fixed in slides 282 and 283 mounted on a stud 280 secured to the machine frame. The rear ends of slides 282 and 283 are pivoted to levers 284 and 285 which in turn are pivoted on a stud 286 secured to the machine frame. Springs 287 connected to levers 284 and 285 normally tension slides 282 and 283 forwardly to a position where clearance is provided between studs 278 and 279 and fingers 276 and 277 when arm 275 is in its normal position engaging shoulders 274.

Upon cycling the machine, as arm 275 swings counterclockwise away from shoulders 274, bell cranks 269 and 270 swing clockwise and slides 259 and 260 swing leftwardly under the tension of springs 265 and 266 until fingers 276 and 277 strike studs 278 and 279, stopping the slides in a position where their rear ends lie in the path of movement of arm 275. As the cycle continues and arm 275 swings clockwise toward its initial position, the arm strikes the rear ends of the slides and thrusts them forwardly. Forward movement of the slides rocks bell cranks 256 and 257 counterclockwise pulling links 254 and 255 toward the left and in turn swinging brackets 252 and 253 to the left to restore slides 246 and pins 47 and 48 to normal starting position. Just prior to arm 275 reaching its home position, the arm strikes shoulders 274 rocking bell cranks 269 and 270 counterclockwise about stud 273, thereby causing rollers 267 and 268 to swing slides 259 and 260 to the right sufficiently to withdraw the rear ends of the slides from in front of arm 275. At this moment, springs 265 and 266 move the slides toward the rear and slides 246 toward the right a slight increment until the escapement mechanism (not shown) associated with each slide 246 engages its slide preparatory to the next amount indexing operation.

Upstanding posts such as 288 (Figures 6 and 8) on the right end of slides 246 have beveled faces 289 that engage the rear ends of any set stops 46 and cam them back to normal position incident to the leftward movement of slides 246 above described. The mechanism so far described is identical with that disclosed in Patent No. 2,194,270.

The right end of each lever 284 and 285 lies in front of a depending arm on each of a pair of bell cranks 292 and 293 pivoted on rod 193. Bell cranks 292 and 293 each have a horizontal arm lying beneath corresponding control cams 294 and 295 secured on shaft 19. Springs 287 hold the arms in cooperative relation with the cams.

Figure 7 shows the parts in the positions that they occupy at the end of a third machine cycle. During the latter half of a third machine cycle, one of four cam surfaces 296 on cam 294 cams lever 284 clockwise on stud 286, pulling slide 282 rearwardly. Rearward movement of slide 282 rocks bell crank 269 counterclockwise and thus withdraws slide 259 from the path of restoring arm 275 before the arm engages slide 259 so that the "Consumption" amount may be entered on amount keys 1 during this third cycle and retained indexed ready for printing and accumulation on the first cycle of the next billing operation.

During the second half of the first cycle of the next billing operation shaft 19 is rotated a sufficient distance to remove the just effective cam surface 296 from over the horizontal arm of bell crank 292 and to cause one of four cam surfaces 297 on cam 295 to cam the lever 285 clockwise to pull slide 283 rearwardly. Rearward movement of slide 283 swings bell crank 270 counterclockwise withdrawing slide 260 from the path of arm 275 before the arm restores to home position so that the "Present" amount entered on amount keys 2 before initiating the second cycle is retained in the indexing mechanism during this cycle. The removal of the just effective cam surface 296 from over the horizontal arm of bell crank 292 permits its associated train of parts 284, 282, and 269 to restore so that arm 275 engages slide 259 and clears the "Previous" amount which was entered upon amount keys 1 before initiation of the second machine cycle.

During the second half of the third machine cycle, shaft 19 is rotated a sufficient distance to remove the just effective cam surface 297 from over the horizontal arm of bell crank 293 permitting its associated train of parts to restore to clear the "Present" amount. Simultaneously, the next cam surface 296 of cam 294 becomes effective to retain the "Consumption" amount indexed on amount keys 1, as before described, and so on.

*Releasing "Present" amount type bars*

Mechanism is provided to hold the "Present" amount type bars in their lowermost positions so that the "Present" amount which, as previously stated, is indexed prior to initiating the second cycle, will not print until the third cycle.

This mechanism includes a type bar lock plate 298 (Figures 2 and 6) pivoted on a rod 299 secured in the machine frame. A spring 302 normally tensions plate 298 clockwise about the rod so that its lower edge lies over the rear ends of the "Present" amount type bars 13, preventing their upward movement. A rearwardly projecting arm 303 on the plate carries a pin 304 that rests above a horizontal arm of a bail 305. Bail 305 is pivoted on a rod 306 stationary in the machine frame and has a depending arm 307 at its opposite end that lies in front of a depending arm of a bell crank 308 pivoted on rod 103. A horizontal arm of bell crank 308 is held in cooperative relation with a release cam 309 secured on shaft 19, by tension of spring 302 through the train of connections just described. Figures 2 and 6 show the parts in the position they occupy at the end of a third machine cycle, with plate 298 in effective position. Shaft 19 is rotated a sufficient distance during the first and second cycles combined, to cause one of four cam surfaces 312 on cam 309 to cam bell crank 308 and bail 305 clockwise. Clockwise movement of bail 305 removes plate 298 from effective position. Hence, upon the ensuing (automatically initiated) third cycle, the "Present" amount type bars are allowed to rise and print.

During the second half of the third cycle, shaft 19 is rotated a distance sufficient to remove the just effective cam surface from over the horizontal arm of bell crank 308 as shown in Figure 6 whereupon the parts restore to normal position under tension of spring 302, plate 298 swinging clockwise over the rear ends of the "Present" amount type bars 13 immediately upon their reaching their lowermost positions.

The platen by which the work is supported against the pressure of the type during a printing operation is mounted on a shaft 316 journaled in the frame and may be rotated to line space the work sheets by a knob 318 secured to the right hand end of the shaft. The shaft may also be rotated automatically to line space by mechanism such as that shown and described in applicant's pending application, Serial No. 399,461 of which the present application is a division. This automatic platen rotating mechanism, is not shown or described in this application.

The left hand group of type bars is arranged to print on the tally strip and the bill or card and the right hand group is arranged to print upon the bill only.

The present machine preferably is provided with a ribbon lift mechanism such as that disclosed in Patent No. 2,194,270. This mechanism is briefly described in application, Serial No. 399,461.

The "Consumption" amount is printed through the carbon directly upon the tally during the first machine cycle of a billing operation before inserting a bill. A bill is then taken from the supply magazine 12 (Figure 1) and dropped into the chute. The machine preferably embodies mechanism for automatically adjusting the bill in a predetermined position laterally in the bill chute before the printing operation takes place. This mechanism comprises a device 312 for engaging the right end of the bill and operating to push the bill to the left against the left end wall of the chute. This bill adjusting mechanism is controlled from the ribbon lift mechanism and is fully shown and described in applicant's pending application, Serial No. 399,461.

Following the printing of the "Previous" and "Present" amounts during the second and third machine cycles, the "Consumption" amount is automatically punched and the bill is ejected by mechanisms arranged to operate in the manner hereinafter described. Suffice it now, however, to note that by the mechanism just described the bills are automatically positioned into proper location in chute 9 before the printing and punching operations take place and that by this construction the operator may rapidly remove bills from the magazine and drop them into the chute in a casual manner.

The punch mechanism is constructed and arranged to cut slots in the left hand portion of the lower margin of the bill in code to represent the "Consumption." The punch operating mechanism is controlled from the crossfooter and is rendered operative during the last part of the third cycle of the machine, only if the subtraction of the present amount on the crossfooter reduces the crossfooter to zero.

The machine embodies selecting mechanism for the punches controlled from the left group of type bars to select and set up the punch actuators in accordance with the positions in which the type bars are located to print the consumption on the tally strip. The punch actuators are thus set up to punch or slot in code the lower margin of the bill to represent the number printed by the type bars.

The punches and punch operating mechanism and the punch selecting mechanism are the same in construction, arrangement and mode of operation as the corresponding mechanisms illustrated and described in applicant's original application, Serial No. 399,461.

The present machine comprises mechanism for feeling the condition of the cross footer after the "Present" amount has been subtracted and the mechanism for operating the punches is controlled by the feeling mechanism. If the subtraction reduces the crossfooter to zero, the punch operating mechanism is rendered operative and the bill is slotted to represent the consumption at the end of the cycle. If the subtraction does not reduce the crossfooter to zero, indicating an error in the taking of the amounts from the meter book or other record or in the computation, the punch operating mechanism is not rendered operative and the bill is not slotted. This feeling mechanism has the same construction and mode of operation as the corresponding mechanism illustrated and described in applicant's original application, Serial No. 399,461.

The machine is also preferably provided with an automatic bill ejecting mechanism such as that shown and described in application Serial No. 399,461 for automatically ejecting a completed bill from within the chute 9, following the punching operation. When a non-punching occurs because of an error in billing, the bill ejecting mechanism is not rendered operative and the bill is not ejected. Non-ejection of a bill augments the signal of non-punching to notify the operator of the error. This bill ejecting mechanism is not shown or described in this application.

A normal billing operation involving a "Consumption" of "75," a "Previous Reading" of "125" and a "Present Reading" of "200" will now be described.

The tally strip 8 lies directly behind the right end of the bill with a carbon strip between the bill and the tally strip.

The "Consumption" amount "75" is first indexed in the left hand set of amount keys 1 and the motor bar 6 is depressed to initiate the first machine cycle.

During the first machine cycle:

(a) The "75" is printed directly through the carbon on tally strip 8.

(b) The "75" is added on the crossfooter and on the left section of one of the registers (not shown).

(c) The punch actuators (not shown) are set up by the punch selecting mechanism.

(d) A bill count is added on the right section of the latter register.

(e) The platen is automatically rotated to advance the tally strip by the platen rotating mechanism (not shown).

(f) The left keyboard is cleared by mechanism (not shown).

The bill is then inserted in the chute 9, the "Previous" amount "125" is indexed on the left set of amount keys 1 and the "Present" amount "200" is indexed on the right set of amount keys 2. The motor bar 6 is again depressed to initiate the second machine cycle.

During the second cycle:

(a) The "125" is printed on the bill and, through the carbon, on the tally strip.

(b) The "125" is added on the crossfooter and in the left section of the other register (not shown).

(c) The left keyboard is cleared.

(d) The "Present" amount "200" is retained indexed but is non-printed and non-accumulated by virtue of type bar lock 298 for the right group of type-bars.

(e) No line space movement is imparted to the platen.

(f) Motor repeat cam 94 automatically initiates the third cycle of the machine.

During the third machine cycle:

(a) The "200" is printed by the right group of type bars upon the bill and, through the carbon, on the tally strip.

(b) The "200" is subtracted upon the crossfooter and is added in the right section of the latter register.

(c) The platen is automatically rotated to advance the tally strip 8.

(d) The right keyboard is cleared.

At the end of the third cycle, since the subtraction of the "Present" amount "200" from the added "Consumption" and "Previous" amounts "75" and "125" brings the wheels of the crossfooter to zero, proving the transaction, the punch actuating mechanism (not shown) is operated to slot the lower margin of the bill in code to represent the "Consumption."

It is to be understood that the particular structure shown in the drawings of this application is merely illustrative of the invention and that the invention is not limited thereto but that it may be embodied in other forms within the scope of the claims.

Having explained the nature and object of the invention and having specifically described a construction embodying the invention in its preferred form, what is claimed is:

1. In an accounting machine, cycling mechanism including a motor, a manual control therefor, mechanism for causing the machine to execute a single cycle upon the initial actuation of said control and to cause the machine to execute a second cycle upon the second actuation of said control and means for automatically causing a third cycle at the end of each second cycle of the machine.

2. In an accounting machine, cycling mechanism including a motor, a manual control therefor, mechanism for causing the machine to execute a single cycle upon the initial actuation of said control and to cause the machine to execute a second cycle upon the second actuation of said control and means actuated by the motor for automatically causing a third cycle to follow each second cycle of the machine.

3. In a machine of the class described cycling mechanism including a motor, a manually operable device for controlling the motor, mechanism for causing the machine to execute a single cycle upon the initial actuation of said device and to cause the machine to execute a second cycle upon the second actuation of said device, a cycle cam for automatically initiating a third cycle of the machine at the end of each second cycle and driving means between the motor and said cam.

4. In a machine of the class described, a register, a set of differential members arranged to enter numbers in said register by actuating the register in one direction only, an independent set of differential members arranged to enter numbers in said register by actuating the register in the opposite direction only, cycling mechanism for causing the machine to execute three successive cycles to complete three number entering operations, means for causing the first set of differential members to operate during two of said cycles and means for causing the second set of differential members to operate during the remaining cycle.

5. In a machine of the class described, a register, a set of differential members arranged to enter numbers in said register in an adding direction only, a second set of differential members movable independently of said first members and arranged to enter numbers in said register in a subtracting direction only, cycling mechanism for causing the machine to execute three successive cycles to complete three number entering operations, means for causing the first set of differential members to operate during two of said cycles, means for causing the second set of differential members to operate during the remaining cycle, two sets of type bars connected respectively with the two sets of differential members, types carried by said bars, means for actuating the types carried by one of said sets of type bars to print numbers entered in the register respectively during two of said cycles and means for actuating the types carried by the other set of type bars to print numbers entered in the register during the remaining cycle.

6. In a machine of the class described, two sets of amount indexing keys, a register, a set of differentially movable register actuating devices controlled from one of said sets of keys and constructed to actuate the register in one direction only, another set of differentially movable register actuating devices independent of said first devices, controlled from the other of said sets of keys and constructed to actuate the register in the opposite direction only, cycling mechanism for causing the machine to execute a plurality of cycles to complete amount entering operations according to a predetermined program, means for causing one of said sets of register actuating devices to actuate the register in one direction during one of said cycles and means for causing the other of said sets of register actuating devices to actuate the register in the opposite direction during another of said cycles.

OSCAR J. SUNDSTRAND.

REFERENCES CITED

The following references are of record in the file of this patent:

UNITED STATES PATENTS

| Number | Name | Date |
|---|---|---|
| 1,957,501 | Horton | May 28, 1934 |
| 2,050,022 | Shipley | Aug. 4, 1936 |
| 2,060,191 | Gelpke | Nov. 10, 1936 |
| 2,079,355 | Lee | May 4, 1937 |
| 2,167,714 | Goldberg | Aug. 1, 1939 |
| 2,320,399 | Anderson | June 1, 1943 |
| 2,361,707 | Pott | Oct. 31, 1944 |